Aug. 9, 1932.  F. A. OLMSTEAD  1,871,424
ANTISKID DEVICE
Filed Dec. 18, 1930

INVENTOR
Frederick A. Olmstead
BY
Brockett, Hyde, Higley & Meyer
ATTORNEYS

Patented Aug. 9, 1932

1,871,424

UNITED STATES PATENT OFFICE

FREDERICK A. OLMSTEAD, OF CLEVELAND HEIGHTS, OHIO, ASSIGNOR TO THE CHAIN PRODUCTS COMPANY, OF CLEVELAND, OHIO, A CORPORATION OF OHIO

ANTISKID DEVICE

Application filed December 18, 1930. Serial No. 503,149.

The invention disclosed in this application relates to anti-skid devices of the non-metallic cross pad type.

The object of the present invention is to provide a non-skid device, including the usual side chains and transverse cross pads, of the non-metallic type, shaped to conform to the transverse configuration of the tread of the tire so that the device as a whole may be readily applied to a tire with greater ease even than the modern tire chains, or any other non-metallic cross pad anti-skid device.

Another object is to provide each of the pads with a road engaging pad or member which presents a flat surface to the road, whereby traction is enhanced and there is a more direct action between the anti-skid device and the tire. These pads may be provided with an all-weather surface of any type, but a very advantageous type is one wherein it is provided with transverse ridges and depressions in saw-tooth arrangement, which not only adds traction but also tends to produce a squeegee effect by reason of the fact that upon slippage the water is cleaned from the road and the rubber will hold on the substantially dried or squeegeed surface.

Another important object of the invention is to connect the pad members to the side chains by hooks, each of which has two hook portions engaging the side members of two adjacent links of the side chains, so that the pads are firmly held in their proper transverse position and the hooks do not pull at an angle upon the links of the side chains. Another feature in connection with these hooks is that they are left open and each complete pad is embedded in rubber with the rubber extending across the opening of the hooks and severed adjacent the main body of the hook to provide a yielding latching means for holding the pads to the side chain. It is also important that the pads be composed of an inner core of fabric looped around the hooks, in order to be flexible and prevent undue heating when embedded in the rubber. This flexible construction permits the molding of the transverse members to fit the tire and at the same time permits them to be straightened out when the anti-skid device is to be rolled up for storing away.

Other features of invention will be brought out in the following description, drawing and claims.

Figure 1:
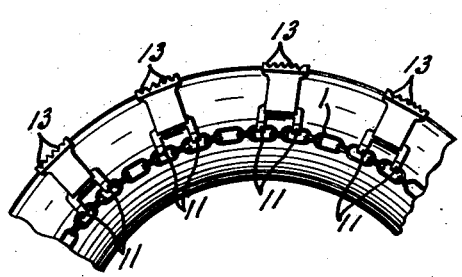
Figure 3:
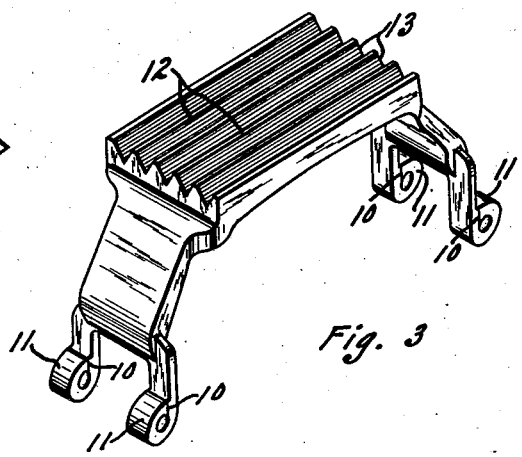
Figure 2:
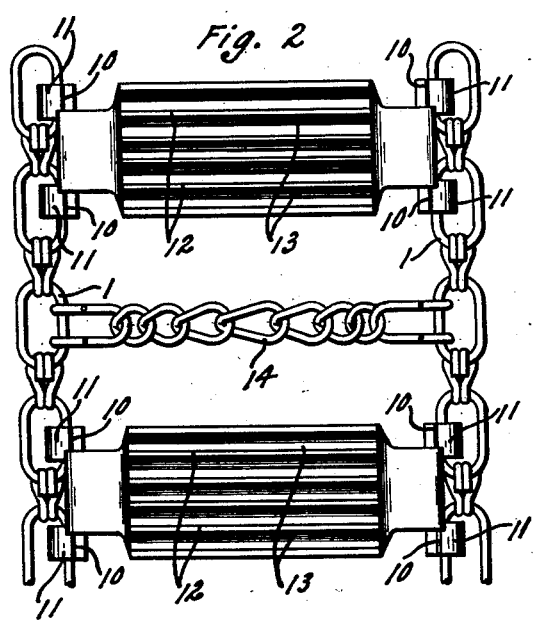
Figure 4:
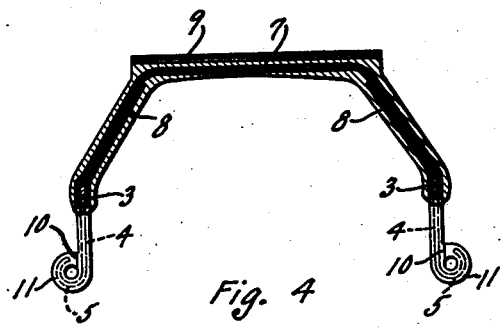
Figure 5:
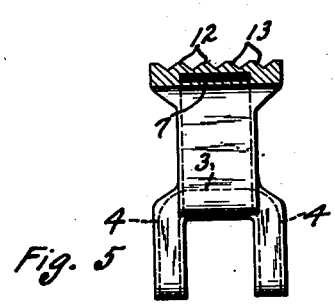
Figure 6:
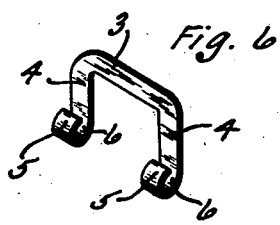

Referring to the drawing, Fig. 1 is a side elevation of a portion of the tire with the device applied thereto; Fig. 2 is a plan view of a portion of the anti-skid device when straightened out; Fig. 3 is a perspective view of one of the pad members; Fig. 4 is a transverse section of the pad member; Fig. 5 is another section extending transversely through the pad member; and Fig. 6 is a detail view of one of the side hooks.

In the embodiment shown, 1 represents a side chain of the usual twisted wire type. These chains are of the well known type and, when in use, are secured at their ends in the usual way. Engaging two adjacent links of each side chain and spaced at intervals throughout their length are the pad members and each of these pad members includes a pair of hooks, one at each end. Each hook comprises a transverse flat portion 3 and side portions 4 terminating in hooks 5, which are left open, as indicated at 6, so that so far as the hooks are concerned they can freely pass onto and off of the side members of the links of the side chain. The hook members may be made of any kind of wire, whether round or flat, but flat wire possesses some advantage in the formation of a flat cross member, for engaging within the loop of the pad, and flat eyes which present flat surfaces to the side portions of the links of the side chains, when applied thereto. Looped around the cross members of two opposed hooks is an inner core or band 7 of fabric. This band extends from the cross member of one hook to the cross member of the other and the inner ends are folded up on the inside, as shown at 8. The core and the hooks when assembled are then covered with a coating of rubber, with a flat tread 9 formed upon the outside. The entire device is set or vulcanized to conform to the cross section of the tread of the tire. The rubber of the hooks is slit, as at 10, so as to provide a free rubber holding device 11 for preventing the accidental removal of the tread members from the side members of the links of the side chains. The flat tread member 9 may be made saw-tooth in cross section, as shown in the drawing, to provide transverse ridges 12 and valleys or depressions 13. This arrangement provides ample gripping surface for the road and also upon slipping tends to act as a squeegee, cleaning the water from the surface and permitting the rubber to hold to the dry road surface.

The device is assembled by snapping the hooks 5 onto the side members of two adjacent links of the side chain, these side members passing by the rubber projections 11. The parts may be assembled in any lengths to provide stock from which tire chains may be cut to fit any car for which the stock chain is adapted, it merely being necessary to sever the correct length and apply the fasteners at the ends of the side chains. This is of great importance because of the modern method of selling tire chain in long lengths so that the tire chains may be tailored from it.

While the pad members are formed to fit snugly the tread portion of the tire, at the same time they may be rolled and stored in the car and ready at any time to be applied with perfect ease by reason of the fact that the tread members snugly fit the tread of the tire and stay where they are put until the ends of the side chains are properly fastened. Indeed, the molding of the cross pad members to fit the tread of the tire assists very materially in the application of the device to the tire and in this respect is better than the usual anti-skid devices where the cross members are chains.

If desired, the rubber pads may be interspersed with cross chains 14, as shown in Fig. 2.

Having described my invention, I claim:

1. A cross member for non-skid tire chains, comprising a pair of like hook members each comprising a body portion and parallel side hook arms depending therefrom, a reinforcing band connecting the body portions of said two hook members, and a continuous covering of rubber in which said hook members and reinforcing band are molded so as to completely encase the same as a single unit, said unit being molded to conform to the shape of the tire and having the intermediate portion shaped to provide a flat non-skid road engaging surface.

2. A cross member for non-skid tire chains, comprising a pair of like hook members each comprising a body portion and parallel side hook arms depending therefrom, a reinforcing band connecting the body portions of said two hook members, and a continuous covering of rubber in which said hook members and reinforcing band are molded so as to completely encase the same as a single unit, said unit being molded to conform to the shape of the tire and having the intermediate portion shaped to provide a flat non-skid road engaging surface, the ends of the hook arms of said hook members being bent to form side chain engaging hooks, with the encasing rubber thereof severed between the ends of the hooks and the side arms, to provide a releasable connection for side chains.

In testimony whereof I hereby affix my signature.

FREDERICK A. OLMSTEAD.